United States Patent [19]

Barnes

[11] 4,208,825

[45] Jun. 24, 1980

[54] NON-FOULING CONTAINER FOR LURES WITH FISH HOOKS

[76] Inventor: Robert R. Barnes, 10735 W. 26th Ave., Denver, Colo. 80215

[21] Appl. No.: 944,902

[22] Filed: Sep. 22, 1978

[51] Int. Cl.² ............................................. A01K 97/06
[52] U.S. Cl. ............................................. 43/57.5 R
[58] Field of Search ............... 43/57.5 R; 206/223, 206/315 R, 348, 579; 220/20, 22

[56] References Cited

U.S. PATENT DOCUMENTS

| | | | |
|---|---|---|---|
| 2,629,200 | 2/1953 | Woodhead | 43/57.5 R |
| 2,948,080 | 8/1960 | Hawley | 43/57.5 R |
| 3,481,066 | 12/1969 | Woolworth | 43/57.5 R |
| 3,797,161 | 3/1974 | Smallwood | 43/57.5 R |
| 3,909,092 | 9/1975 | Kiernan | 220/20 X |

Primary Examiner—James G. Smith

[57] ABSTRACT

A container for hook-carrying fish lures includes an open top bottom section, and external cover stop adjacent the open top, a cover having a peripheral wall seating on the cover stop and spaced from the wall at the open top leaving a space therebetween, and a series of wall openings at the top of the wall of the bottom section when the cover is seated on the cover stop for holding the hooks of fish lures.

6 Claims, 9 Drawing Figures

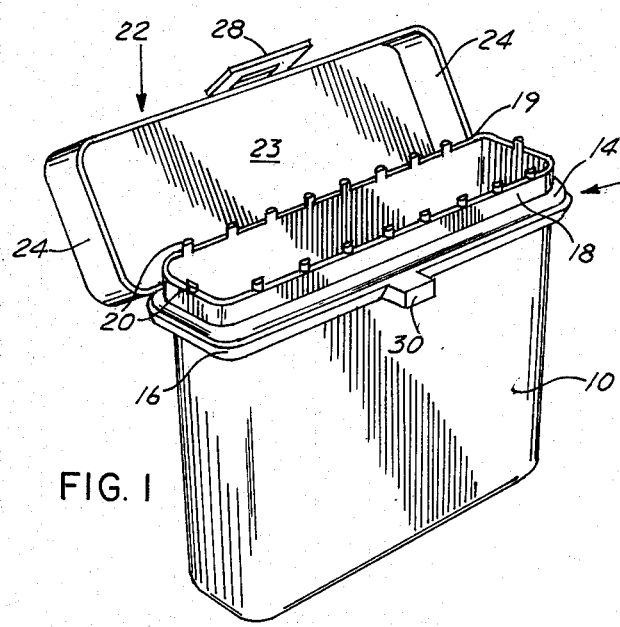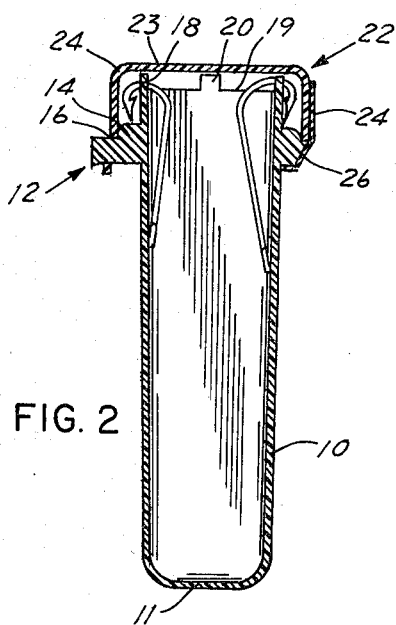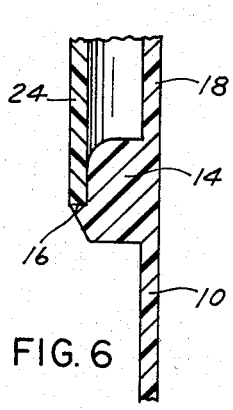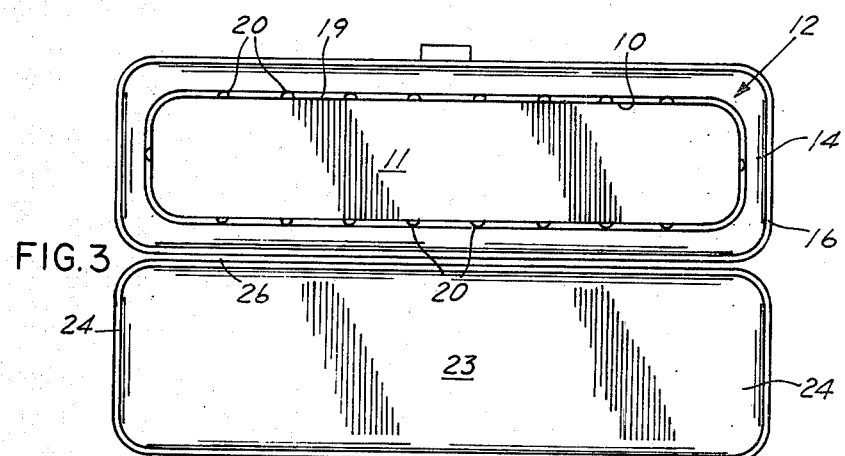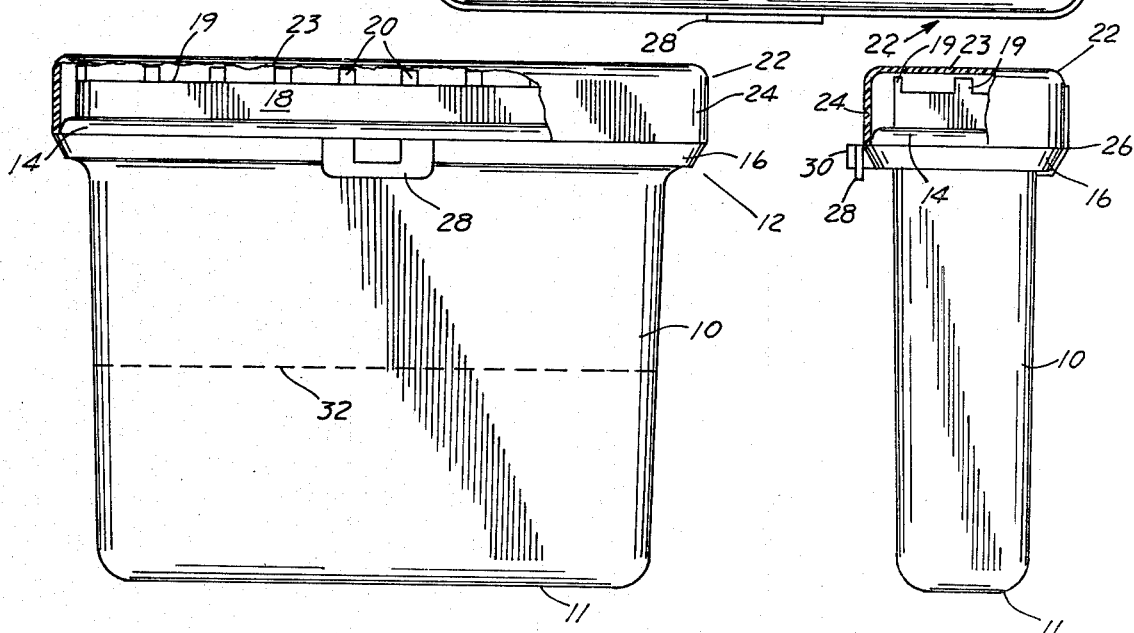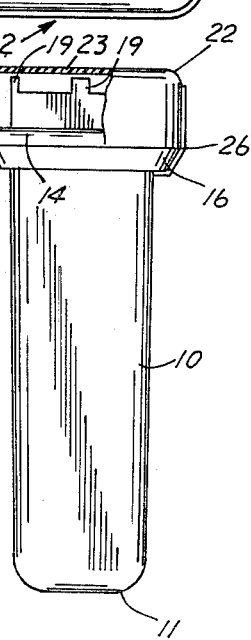

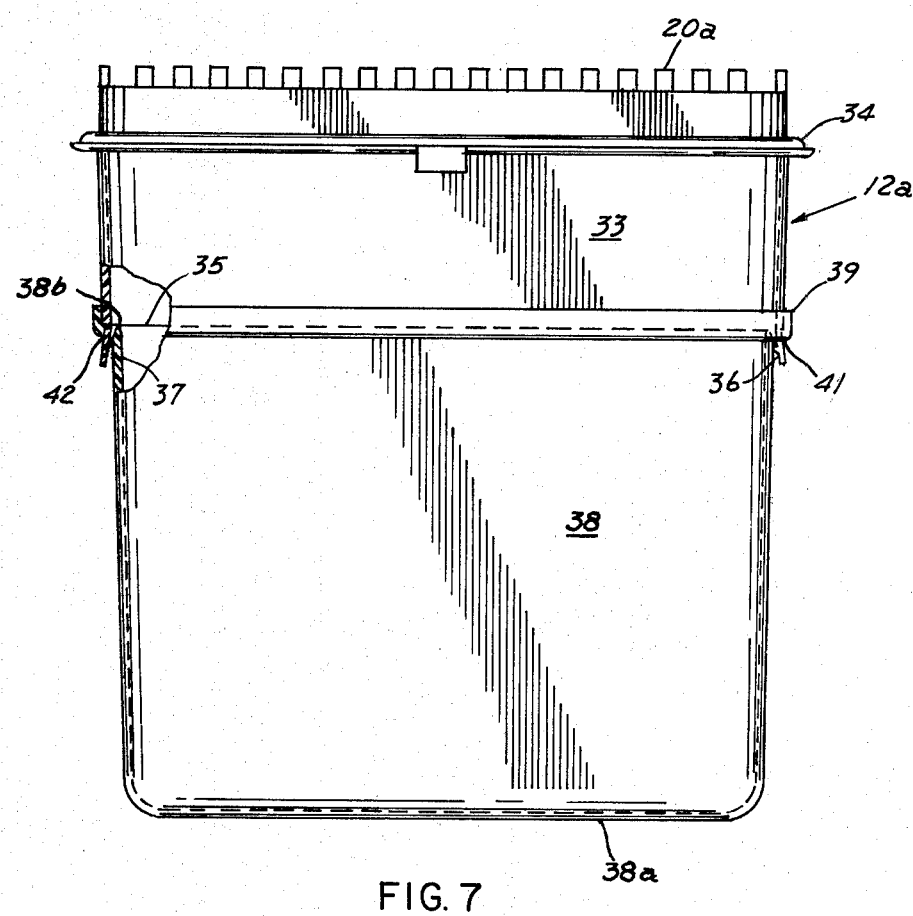
FIG. 7
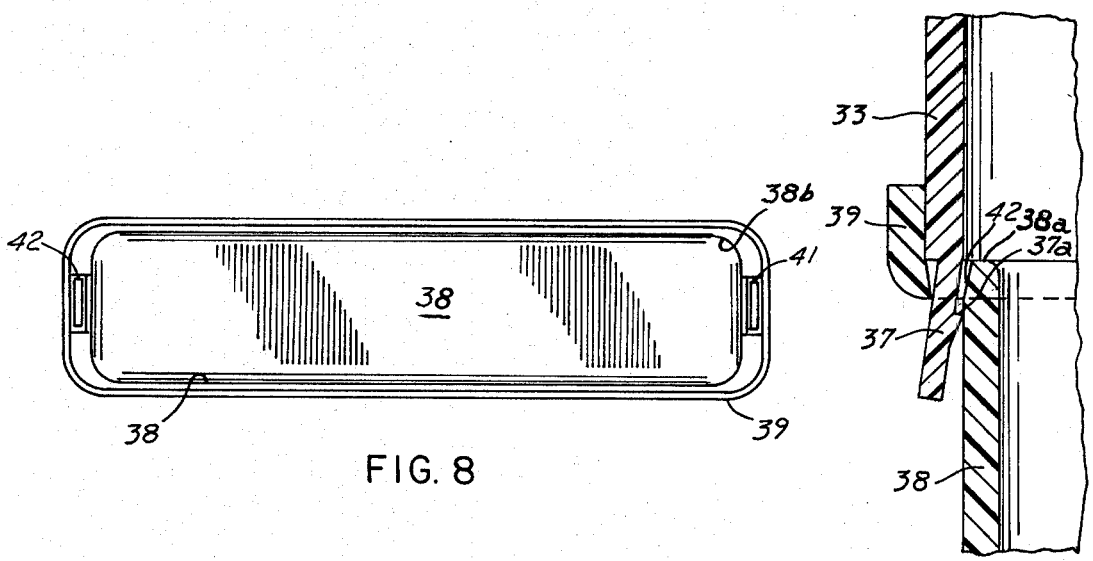
FIG. 8
FIG. 9

NON-FOULING CONTAINER FOR LURES WITH FISH HOOKS

This invention relates to anti-fouling fish lure holders, specifically to small containers for fish lures, which may be pocket carried, having hook holding means to prevent tangling of the hooks.

Fish lures, in particular the type with attached hooks, are easily intermeshed with other lures and get tangled, unless special precautions are taken with them. Lures with treble hooks have a propensity for tangling when stored or carried with other lures. Since a fisherman usually desires a quick change of lures when fishing, an anti-fouling fish lure container would be beneficial to the fisherman.

OBJECTS AND ADVANTAGES

It is, therefore, among the objects and advantages of the invention to provide an anti-fouling fish lure container.

Another object is to provide a fish lure container holding the fish lures individually, and with their fish hooks held apart from the remainder of the lures.

Yet another object of the invention is to provide a fish lure container which is easy to use and provides ready access to single lures.

A further object of the invention is to provide a fish lure container arranged for holding fish lures having treble hooks without fouling with other fish lures.

An additional object of the invention is to provide a small fish lure container, for pocket carrying, and which may be further reduced in size without disrupting its lure carrying capabilities.

These and other objects and advantages may be readily ascertained by reference to the following description and appended illustrations.

GENERAL DESCRIPTION OF THE DRAWINGS

FIG. 1 is a perspective view of an anti-fouling fish lure container, according to the invention, in open position;

FIG. 2 is a side elevational view, in cross-section, of a fish lure container, with the cover in closed position;

FIG. 3 is a top plan view of the fish lure container according to the invention, in open position;

FIG. 4 is front elevational view of the container of the invention, partially cut away, showing the hook holding means;

FIG. 5 is a side elevational view, partially cut away, showing the hook holding means on the end of the container; and, FIG. 6 is an enlarged detail, in section, of the cover stop and cover arrangement.

FIG. 7 is a side view of a modification;

FIG. 8 is a top view of FIG. 7;

FIG. 9 is a sectional view of the locking tabs of FIG. 7.

SPECIFIC DESCRIPTION OF THE DRAWINGS

In the device illustrated, the container includes a container bottom section 10, preferably formed of a synthetic plastic, which is semi-rigid, such as polethylene, polypropylene, polystyrene, among many suitable plastics. The bottom section is of an elongated rectangular lateral section, and reasonably deep. In one size, the rectangular bottom section is about 1 inch by 4½ inches by 4 inches deep. The unit is molded with smooth, rounded corners, suitable for carrying in a pocket.

The bottom section includes a bottom closure 11 integrally secured to walls of the section. A cover stop 12 secured to the bottom section adjacent the open top, includes an extending portion 14, and a shoulder portion 16 below the top of the extending portion 14, shown in detail in FIG. 6. The extending portion 14 curves into the shoulder or ledge 16. The wall of the container 10 includes an extension 18 upstanding beyond the extending portion 14 of the cover stop and terminating in a top edge 19. A plurality of prongs or teeth 20 extend, in planar alignment with the wall, beyond the top edge 19. This provides a series of spaces peripherally of the top wall 19.

A cover 22, with a depending peripheral wall 24, is arranged to cover the bottom section so that the edge of the extending wall of the cover seats on the shoulder 16. This requires the cover wall 24 to be peripherally longer than a wall 18 leaving a space therebetween when the cover telescopes over the wall 18. This space accomodates the barbed hooks of the fish lures as shown in FIG. 2. The height of the wall 24 is dimensioned so that the inside of the top 23 of the cover, is on or in close proximity to the top of the prongs 20, thereby essentially closing the spaces between the prongs when the cover is on the bottom section.

In the form shown, the cover 22 is hinged to the bottom section 10 by a hinge means 26 at the outer edge of the cover stop at one side of the bottom. When formed of a plastic, the hinge may be a thick band of plastic between the shoulder member 16 and the wall 24, at the one side. On the other side of the cover is latch means 28, which may be a loop releasably passing over an extending stub portion 30 extending from the cover stop. The loop and stub may be advantageously formed of the same material as the bottom and cover. For some types of material, the entire container, cover, hinge and latch means may be molded as a single piece. The wall 24 of the cover should be a snug fit on curved portion of the extension 14, FIG. 6, to be securely held on the bottom section and to sit tightly on the shoulder 16. In some instances, the shoulder may be peripheral, providing a complete seal of the wall 24 of the cover on the shoulder 16. In other instances, the shoulder may be discontinuous and a complete peripheral seal is not formed.

In use, a lure is placed in the container, with its attached fish hooks positioned over the top edge 19 of the wall of the bottom section. This leaves the lure portion (spoon, spinner, etc.) hanging in the bottom section of the lure container. The barbed points of the hooks extend into the generally annular space between the wall of the cover and the top wall of the container. The hooks of a number of lures may be hung over the top wall 19 with the lure portion hanging in the container. With treble hooks, two of the three points may be hung over the top wall 19, usually on both sides of a prong. When the cover is pushed onto the bottom section, the spaces between the prongs are effectively closed holding any hook in the spaces as positioned.

In some instances, the fisherman may find the bottom section too long for comfortable carrying in a pocket. For shortening, a cut line, groove or mark 32, FIG. 4, may be provided around the lower portion of the bottom section. By cutting along the line, the closed bottom portion may be removed. Since the hooks are held in the spaces by the cover, the lures hanging in the bottom do not tangle. The open bottom is no detriment to the storage and transport of the fish lures.

It is obvious that different sizes of container may be made for different sizes of lure. For example, a container for fly rod lures would be considerably smaller than one for deep sea fishing lures. The construction should be at least semi-rigid to maintain the box shape of the unit. This, also, includes the consideration of the material, thickness of wall, etc. The material may be transparent for easy identification of the number and type of lures, or may be translucent or opaque. Also, as shown, the prongs may be uniformly spaced around the top of the wall, or may be varispaced.

The space between the cover wall and the top wall portion of the bottom section should be sufficient to accomodate the hooks placed in the unit. The cover wall should be a snug fit over the outside of the extending portion of the cover stop to help form a seal. Additional sealing may be between the cover wall edge and shoulder 16.

The embodiment of FIGS. 7–9 is a modification using a removable bottom for the container body. This embodiment is useful among other things, where long lines are to be stored, where a lure drops into the bottom when other lures are mounted on the prongs (provides easy retrieval), where it is desired to carry the container in a pocket (no bottom is required), etc. This version permits the container to be easily converted from an open bottom container to a closed bottom container. The hook engaging top remains the same for both models.

A container body 12a includes a top portion 33 having upstanding prongs 20a, stop-seal 34 for a top (not shown but would be the same as for FIG. 1) and an open bottom end 35. A pair of opposed holding tabs 36 and 37 are arranged on opposite sides of the portion 33 extending beyond the open bottom 35, in holding position for a bottom closure portion 38. The bottom portion 38 includes a closed bottom 38a and an open top 38b. The bottom portion 38 includes a peripheral short wall portion 39 around the open top 38b, which is ledged outwardly and upwardly so as to closely encompass the bottom edge of the wall of portion 33, shown in detail in FIG. 9. The tabs 36 and 37 extend through openings 41 and 42 respectively in the lateral portion of the ledge of the wall 39, which aids in retaining the bottom cover portion on the upper part of the container body.

The tabs include a sharp spur, for example, spur 37a, FIG. 9, which presses against the wall of the bottom 38 to aid in holding the parts together, but permits separation by pulling the two portions apart. When formed, the tabs 36 and 37 are in general alignment with the wall but the spurs tend to bend the tabs outwardly when against the bottom wall providing good holding. Also, in a preferred form, the material is relatively soft, further aiding in the holding of parts together.

In one form, the bottom closure member is 3.438 inches high, 1.146 inches wide and 4.614 inches long and attachable on the upper portion which is 1.625 inches high with width and length dimensions forming a relatively tight fit in the upstanding wall 39. This gives a container body (both parts together) of about 5¼ inches high, about 5 inches long and about 1½ inches wide. Such a size is satisfactory for pocket carrying.

While the invention has been described by reference to a particular form, the scope of the invention is not limited thereto, except as defined in the appended claims.

What is claimed is:

1. In a pocketsize storage container for internally containing separated fish lures having a hollow, open top container body with an upright peripheral wall, and a cover therefor, the improvement comprising:
    (a) a plurality of depending spaced apart projections extending in general planar on top of and in alignment with the upright walls of the container body forming open slots therein, said projections extending generally at a uniform height along the wall of the container body and generally peripherally of the open top of the container body;
    (b) cover stop means provided on at least one wall of the body for holding and sealing the cover,
    (c) cover lock means depending outwardly from the exterior of said cover stop means adjacent the open top permitting the cover to close over said projections and to lockingly close the open top;
    (d) said spaced projections being constructed and arranged in a length to have their ends closely adjacent the inside of the cover when the cover is seated on the container body thereby providing a series of generally closed spaces around the top of the container body for holding the hook portion of hooks of fish lures with the remainder hanging inside the container, and,
    (e) the cover being constructed and arranged with a short extending peripheral wall for enclosing the top portion of the container body, and having at least one side spaced from the container body providing a space between the top of the wall of the container body and the short wall of the cover to contain the hook portion of the fish lures.

2. The storage container defined in claim 1, wherein said cover stop means is a complete peripheral stop around the wall of the container body and arranged to seal with said short cover stop means.

3. The storage container defined in claim 2, wherein said cover stop means includes an outwardly projecting portion fitting inside the wall of the cover and a shoulder extending from said projecting portion for the seating of the edge of the cover wall.

4. The storage container as defined in claim 1, wherein the top and container body are a one piece unit, with integral hinge means between said cover stop means and a portion of said wall on the cover.

5. The storage container as defined in claim 2, being further characterized by the container body being formed in two parts interconnectable together to form a container with a bottom cover, and said bottom cover being disconnectable forming a container with an open bottom.

6. The storage container of claim 5, being further characterized by extending tabs on at least opposed sides of the upper portion arranged to bear against the wall of the lower portion to aid in holding the portions together.

* * * * *